United States Patent [19]

Donovan

[11] Patent Number: 5,627,597
[45] Date of Patent: May 6, 1997

[54] DEVICE AND METHOD FOR INTERLACING A VIDEO SIGNAL HAVING AN INTEGRAL NUMBER OF SCAN LINES IN EACH FIELD

[75] Inventor: Lawrence E. Donovan, Knoxville, Tenn.

[73] Assignee: Philips Electronics North America Corporation, New York, N.Y.

[21] Appl. No.: 636,679

[22] Filed: Apr. 23, 1996

Related U.S. Application Data

[63] Continuation of Ser. No. 304,736, Sep. 12, 1994.

[51] Int. Cl.$^6$ ........................................... H04N 5/68
[52] U.S. Cl. ................................. 348/550; 348/805
[58] Field of Search ........................... 348/540, 542, 348/550, 553, 805, 441, 554, 558; 315/379; H04N 5/68

[56] References Cited

U.S. PATENT DOCUMENTS

| | | | |
|---|---|---|---|
| 3,982,063 | 9/1976 | Brown et al. | 348/805 |
| 4,605,950 | 8/1986 | Goldberg et al. | 348/558 |
| 4,821,098 | 4/1989 | Smeulers | 358/153 |
| 4,928,182 | 5/1990 | Guerinot et al. | 358/245 |
| 4,942,471 | 7/1990 | Chikuma et al. | |
| 5,089,893 | 2/1992 | Iwase | 358/180 |
| 5,132,793 | 7/1992 | Hirahata et al. | 358/140 |
| 5,146,142 | 9/1992 | Van Tol | 315/382 |
| 5,162,705 | 11/1992 | Golik | 315/382 |
| 5,173,774 | 12/1992 | Bretl et al. | 358/140 |
| 5,239,377 | 8/1993 | Shah et al. | |
| 5,303,044 | 4/1994 | Richards | 348/445 |
| 5,327,235 | 7/1994 | Richards | 348/441 |

OTHER PUBLICATIONS

Society of Motion Pictures and Television Signal Engineers, "Proposed American National Standard for Television Parameters 1050/59.94/2:1 and 525/59.94/1:1 High Definition Production Systems", pp. 1–11.

Primary Examiner—Victor R. Kostak
Attorney, Agent, or Firm—Laurie E. Gathman

[57] ABSTRACT

A television receiver is provided which includes a vertical deflection circuit which causes interlacing of an interlaced video signal having two fields each with an integral number of scan lines. The vertical deflection circuit including a jog circuit coupled to a vertical deflection yoke, which jog circuit causes a change in current through the vertical deflection yoke during reception of one of the fields. This change in current causes the fields to interlace with each other when scanned on a picture tube.

15 Claims, 5 Drawing Sheets

X= NUMBER OF SCAN LINES WHICH ARE NOT SCANNED DURING A VERTICAL RETRACE

DEVICE AND METHOD FOR INTERLACING A VIDEO SIGNAL HAVING AN INTEGRAL NUMBER OF SCAN LINES IN EACH FIELD

This is a continuation of application Ser. No. 08/304,736, filed Sep. 12, 1994.

BACKGROUND OF THE INVENTION

1. Field of the Invention

This invention relates in general to television receivers and in particular to a television receiver for receiving both 525-line interlaced video signals and 1050-line interlaced video signals.

2. Description of the Prior Art

The standard television system established by the National Television Systems Committee (NTSC) is a 525-line interlaced system. In a search for higher resolution, various other television systems have been developed including the 525-line progressive system and the 1050-line interlaced system. The 525-line progressive and the 1050-line interlaced systems are high definition systems which require signals having the standards issued by the Society of Motion Picture and Television Engineers as described in their publication entitled "Proposed American National Standard for Television Signal Parameters 1050/59.94/2:1 and 525/59.94/1:1 High Definition Production Systems", hereby incorporated by reference.

Because of the different types of systems available, it is desirable to have televisions which can operate with a variety of signals. U.S. Pat. No. 5,239,377 is a device for deriving a standard television signal from an interlaced high definition signal for display on a standard television receiver. U.S. Pat. No. 5,239,377, however, does not enable the television receiver to display both high definition signals and standard television signals. The differences between the NTSC, 525-line progressive and 1050-line interlaced make it difficult to create a television receiver which is operable for more than one type of signal.

As described in "Television How it Works" by J. Richard Johnson 2nd ed. 1956, also incorporated by reference, a 525-line interlaced signal includes (i) two fields each having 262.5 scan lines, and (ii) vertical and horizontal sync signals. (It should be noted that other conventional systems operate in the same manner as the NTSC system but the number of scan lines may vary). An electron beam scans each field on a picture tube in 1/60th of a second from left to right forming horizontal scan lines which progress from the top of the picture tube to the bottom of the picture tube. A horizontal sync signal indicates the end of a horizontal scan line. Upon detection of a horizontal sync signal the electron beam begins a new scan line which is oriented on the picture tube below the previous scan line. To begin a new scan line, the electron beam performs a horizontal retrace as shown in FIG. 1a and described below.

The vertical sync signal indicates the end of a field, or in other words, when the required number of horizontal scan lines have been completed. Upon detection of a vertical sync signal the electron beam returns to the top of the picture tube (a vertical retrace) to begin scanning a new field. The vertical retrace is not instantaneous and depending on the system can take anywhere from 10 to approximately 21 scan lines of the 262.5 scan lines. The vertical spacing between consecutive horizontal scan lines in a field is caused by the vertical deflection yoke deflecting the electron beam during a horizontal scan according to a vertical ramp signal. The vertical ramp signal is synchronized by an oscillator which is synchronized to the vertical sync signal. The timing of the oscillator is controlled by the sync pulse. Because this vertical ramp signal is applied to the vertical deflection yoke during scanning of the horizontal scan lines, the horizontal scan lines are slightly angled as shown in FIG. 1a. The voltage level of the vertical ramp signal causes a corresponding ramp-like current in the vertical deflection yoke. The amount of current in the vertical deflection yoke corresponds to the vertical position, on the picture tube, of the horizontal scan lines during scanning. Although the vertical deflection yoke can be coupled so that positive yoke current will either deflect the electron beam upwards or downwards, for ease of description it will be assumed that positive current in the vertical deflection yoke, produces upward deflection. Thus at the beginning of a field the positive current in the vertical deflection yoke causes the electron beam to be deflected to the top of the picture tube. It will also be assumed that the voltage level, and corresponding vertical yoke current decreases in a ramp-like fashion during scanning of each field (although depending on surrounding circuitry and the positioning of the vertical deflection yoke, the voltage level may increase in some systems during scanning of each field). This ramp signal is synchronized to the vertical sync signal such that a new ramp signal is generated each time a field has been completely scanned. The synchronization of the vertical and horizontal sync signals and the associated vertical ramp signals cause the electron beam to scan each successive horizontal scan line displaced from the preceding horizontal scan line by a predetermined amount, in the vertical direction, according to the ramp-like change in the vertical deflection yoke current, until all scan lines of each field are completed.

FIG. 1a shows how the two fields are interlaced in a 525-line-type interlaced system (NTSC). This same type of interlacing is also used in any conventional interlaced system having a non-integral number of scan lines in each field (hereinafter referred to as a conventional system or conventional signal). The open lines with solid arrows represent field 1 scan lines. The solid lines with solid arrows represent field 2 scan lines. The dashed lines with open arrows are the horizontal retraces for field 1. The dashed lines with solid arrows are the horizontal retraces for field 2. The dashed and dotted line with open arrows is the vertical retrace after a field 1 scan has been completed. The dashed and dotted line with solid arrows is the vertical retrace after a field 2 scan has been completed.

The scanning of an NTSC system begins at the beginning of, for example line 1, and scans the first scan line until a horizontal sync signal is detected. Once the horizontal sync signal is detected the electron beam performs a horizontal retrace, that is, no video signal is scanned and the electron beam positions itself at the beginning of the next horizontal scan line. As discussed above, the vertical position of each of the horizontal scan lines is determined by the value of the vertical ramp signal, i.e. the amount of current through the vertical deflection yoke at each point in time during a horizontal scan. Scanning is continued until 241.5 lines are scanned. (This assumes that a vertical retrace requires the amount of time corresponding to the scan time for 21 scan lines.) During scanning of the 242nd line, i.e. at a non-integral line number of 241.5, a vertical sync signal will be detected and the electron beam will traverse back to the top of the picture tube (execute a vertical retrace), during the next 21 scan lines, to begin scanning a new field. Since the electron beam is in the middle of a horizontal scan line when a vertical sync signal is detected, e.g. 241.5, it will begin scanning the first scan line of the second field at the middle M of the scan line. The middle M of the first scan line of the second field is at the same point, vertically, as the beginning B of the first scan line of the first field as these points correspond to the same current level in the vertical deflection yoke, i.e. the same current level induced by the vertical ramp signal. Therefore, due to the non-integral number of scan lines in each field, the scanning of the horizontal scan lines of the second field are now offset vertically from the respective horizontal scan lines of the first field by a distance equal to one-half the distance between two consecutive scan lines of the same field which causes the scan lines of the second field to be scanned between the scan lines of the first field creating a "naturally" interlaced picture as shown in FIG. 1a. This offset will be hereinafter referred to as the one-half line offset or deflection etc. The last line of the second field, e.g. the 242nd line, is scanned to completion since the scanning of the second field began in the middle of the first scan line.

The 525-line progressive system, which is shown in FIG. 1b, does not have two fields but rather only one field having 525 scan lines, a sample of which is shown as lines A–J in FIG. 1b. The 525 lines are scanned progressively within 1/60th of a second. There is no interlacing.

In the 1050-line interlaced system, there are 525 lines in a first field and 525 lines in a second field and each field is scanned in 1/60th of a second. Again, the vertical retrace requires anywhere from approximately 10 to approximately 21 scan lines of the 525 scan lines. Since each field has an integral number of scan lines, the "natural" interlacing does not occur, that is, each field is scanned beginning at the beginning of a scan line and ending at the end of a scan line. Because there is no "natural" interlacing in the 1050-line interlaced system, if the 1050-line interlaced signal is used with a conventional display system such as an NTSC (525-interlaced) system, the second field of 525 scan lines would be scanned directly over the first field of 525 scan lines.

SUMMARY OF THE INVENTION

Generally speaking, in accordance with the invention, a television receiver is provided which is operable for both the standard NTSC system and the 1050-line interlaced system. The television receiver includes a conventional display vertical deflection circuit, which is designed to process the NTSC signal. Also provided is a jog circuit coupled to the conventional vertical deflection circuit for use with a 1050-line interlaced signal only. A vertical ramp generator generates a vertical ramp signal each time a vertical sync signal, indicating the end of a field, is detected. During every other vertical ramp signal, i.e. during reception of the second fields, the jog circuit increases the current through the vertical deflection yoke. This increase in current is with respect to the current through the vertical deflection yoke during reception of the first field, and is selected such that the electron beam is deflected enough during scanning of the second field to cause the scan lines of the second field to be scanned between the scan lines of the first field thereby creating an interlaced picture.

The jog circuit comprises a switch and a resistor coupled to the vertical deflection yoke which switch is turned ON when, for example, the second field is being received and OFF when the first field is being received. The value of the resistor is chosen to increase the amount of current through the vertical deflection yoke enough to cause a one-half line deflection in the vertical direction of the scan lines of the second field with respect to the scan lines of the first field thereby causing the second field to interlace with the first field. In other words the current through the vertical deflection yoke, during reception of both the first field and the second field, varies according to the voltage ramp signal, but the amount of current in the vertical deflection yoke is increased overall during reception of the second field.

A field identification signal is generated from the vertical sync signal. The field identification signal indicates the period of time the first field is being received, the period of time the second field is being received and which of the two fields is being received. This field identification signal is used to control the switch of the jog circuit by turning the switch ON during reception of the second field and OFF during reception of the first field thereby jogging all of the scan lines of the second field by one-half of a line in the vertical direction with respect to the scan lines of the first field so that the second field is interlaced with the first field.

Accordingly, it is an object of the invention to provide a jog circuit for operation with an interlaced video signal having two fields each having an integral number of scan lines, and which jog circuit changes the amount of current through the vertical deflection yoke of a picture display device during reception of one of the fields of the interlaced video signal such that an interlaced picture is formed.

A further object of the invention is to provide a method of increasing the current through the vertical deflection yoke to cause the second field of a 1050-line interlaced signal to interlace with the first field.

Another object of the invention is to provide a vertical deflection circuit which is operable for both NTSC signals and 1050-line interlaced signals.

Yet another object of the invention is to provide a jog circuit for a vertical deflection amplifier, which vertical deflection amplifier is for use in an NTSC type system and which jog circuit is coupled to the vertical deflection yoke and only necessary during receipt of an interlaced video signal having an integral number of scan lines in each field. The jog circuit includes a transistor and a resistor for varying the amount of current through the vertical deflection yoke. The transistor being responsive to a field identification signal which causes the transistor to turn ON during reception of one of the fields of an interlaced video signal having an integral number of scan lines and OFF during reception of the other of the fields, causing the amount of current through the vertical deflection yoke to change by an amount corresponding to a one-half line vertical deflection of all horizontal scan lines of one of the fields.

Still a further object of the invention is to provide a television receiver having a vertical deflection circuit which is operable for both conventional interlaced signals and 1050-line interlaced signals.

Still other objects and advantages will be apparent from the specification.

The invention accordingly comprises the features of construction, combination of elements, and arrangement of parts which will be exemplified in the embodiments hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 2A:
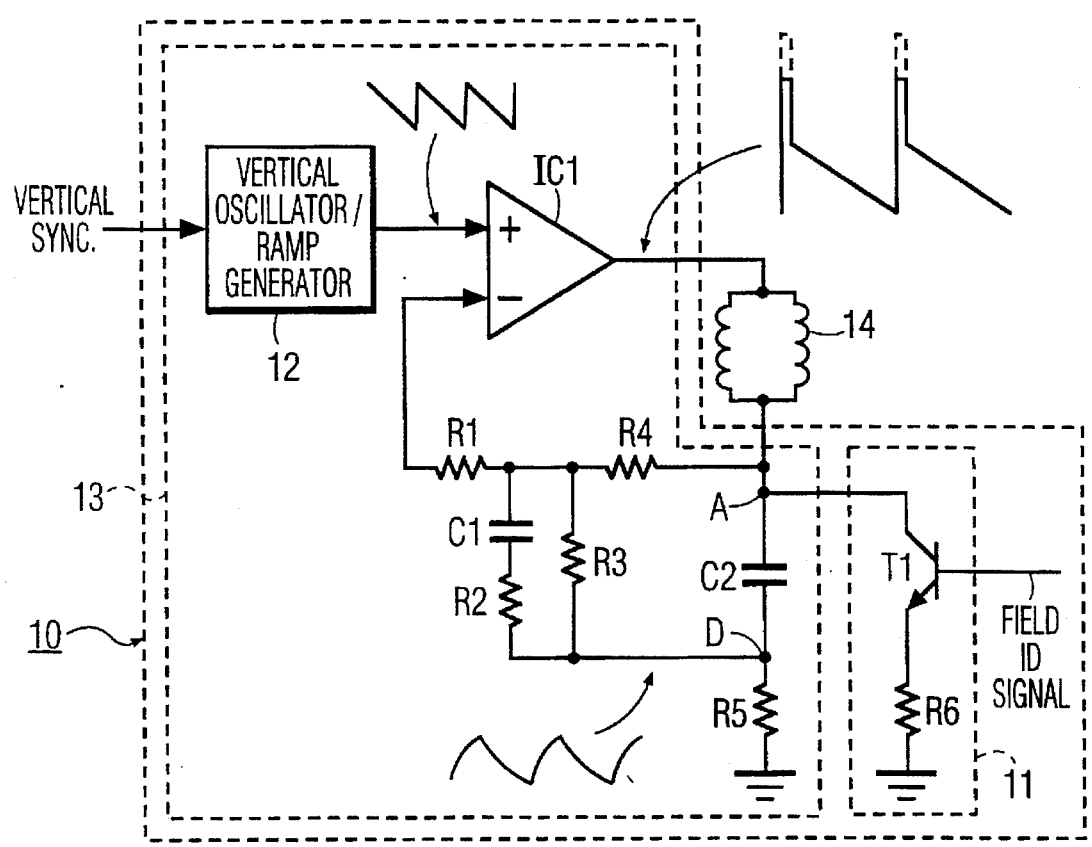
FIG. 2a shows the circuit diagram of a vertical deflection circuit in accordance with the invention.

Reference is first made to FIG. 2a which depicts the vertical deflection and jog circuit in accordance with the invention and generally indicated at 10. The input to the vertical deflection and jog circuit is the vertical sync signal which has the form, for example, described and depicted in the proposed standards issued by the Society of Motion Picture and Television Engineers. The vertical sync signal is received by a vertical oscillator/ramp generator 12 which generates a voltage ramp signal at the non-inverting input of amplifier IC1 each time a vertical sync signal indicating the end of a field is received. The output of amplifier IC1 is coupled to a first end of vertical deflection yoke 14 which vertical deflection yoke 14 generates a ramp-like current in response to the voltage ramp signal. This ramp-like current causes vertical deflection of the scan lines during scanning. Amplifier IC1 of amplifier circuitry 13 is an AC coupled amplifier. Amplifier circuitry 13 is the vertical deflection circuitry used in a conventional display device or an NTSC display device. A jog circuit 11, coupled to vertical deflection yoke 14, is also provided and includes a transistor T1 and a resistor R6. This jog circuit 11 is for use with interlaced video signals having an integral number of scan lines in each field. Resistor R6 has one end coupled to the emitter of transistor T1, and the other end coupled to ground and is chosen so as to provide the proper vertical deflection of the scan lines of the second field of a 1050-line interlaced signal. Capacitor C2 has a first end coupled to the collector of transistor T1, a second end of the vertical deflection yoke 14, and a first end of a resistor R4. The second end of capacitor C2 is coupled to a first end of a resistor R5, a first end of a resistor R3 and a first end of a resistor R2. The second end of resistor R5 is coupled to ground. The second end of resistor R3 is coupled to the second end of resistor R4, the first end of a capacitor C1 and the first end of a resistor R1. The second end of resistor R2 is coupled to the second end of capacitor C1. The second end of resistor R1 is coupled to the inverting input of amplifier IC1.

Figure 2B:
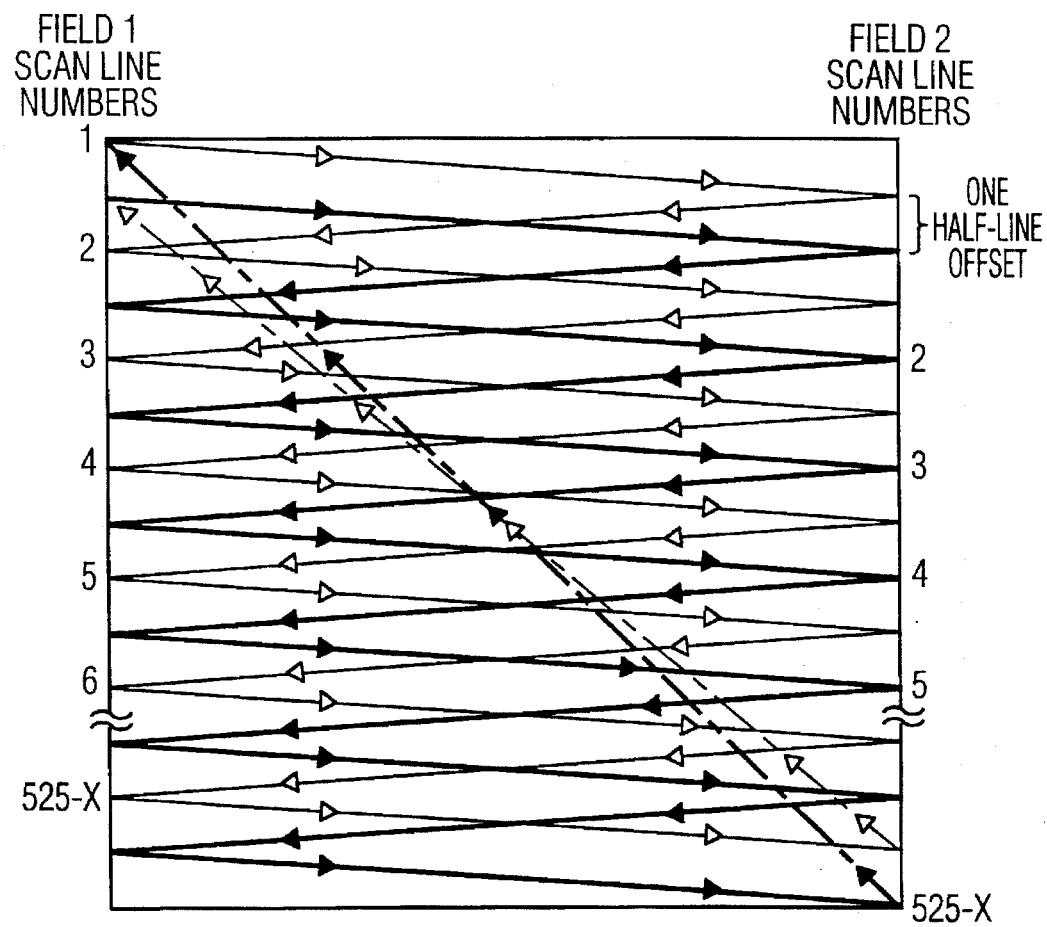
FIG. 2b shows the scanning path for a 1050-line interlaced system in accordance with the invention.

Operation of the circuit is as follows: The output of amplifier IC1 is a voltage ramp signal which induces a ramp-like current in the vertical deflection yoke 14 which current is shown in FIG. 2d. This voltage ramp, however, has a voltage spike at the beginning of each ramp, as shown in FIG. 2a, which enables a rapid increase in vertical deflection yoke current during a vertical retrace. The amplifier IC1 is coupled so that it constantly attempts to match the current through the vertical deflection yoke 14 with the ramp signal received at its non-inverting input from the ramp generator 12. The input to the inverting input is also a ramp-like signal which is dependent on the vertical deflection yoke current. Resistor R5 is the component which is primarily used to sense the vertical deflection yoke current. Because the current through the vertical deflection yoke cannot instantaneously change to match the input ramp signal during a vertical retrace, an exponential ramp exists, at point D in FIG. 2a, in the vertical deflection yoke current during a vertical retrace. This exponential ramp is applied to the inverting input of amplifier IC1 and causes a voltage spike during a vertical retrace at the output of amplifier IC1 by driving the amplifier into saturation. That is, the amplifier IC1 tries to match the input ramp signal. Since the vertical deflection yoke current cannot change that fast, (L di/dt of the vertical deflection yoke is finite) a voltage difference in the voltages at the non-inverting and the inverting inputs of the amplifier IC1 exists which drives the amplifier IC1 into saturation due to ICl's high open loop gain. As explained above, the voltage spike enables a very quick increase of the current in the vertical deflection yoke 14 during a vertical retrace so that loss of picture information is limited. Capacitor C2 is provided to block the DC component from the vertical deflection yoke 14, but not the AC component. Resistors R3, R4 provide DC feedback from the vertical deflection yoke 14 for a DC bias of the amplifier IC1. Capacitor C1 and Resistor R2 provide an AC feedback path for feedback of the voltage across R5 to the inverting input of amplifier IC1. Resistor R6 is chosen at a value which will cause a one-half line shift, in the vertical direction, of the horizontal scan lines of the second field from the horizontal scan lines of the first field.

Figure 2C:
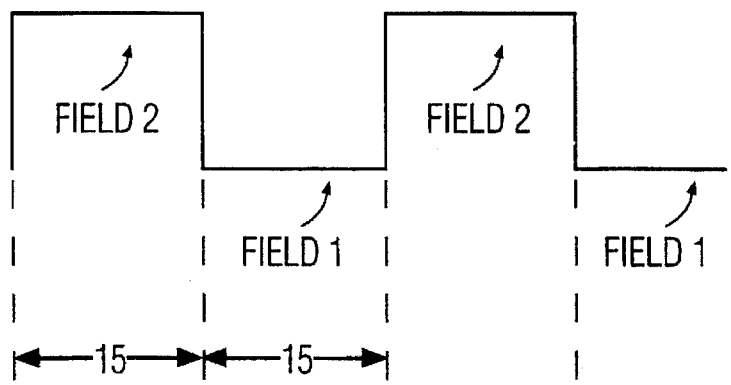
FIG. 2c shows the form of the field identification signal in accordance with the invention.
Figure 2D:
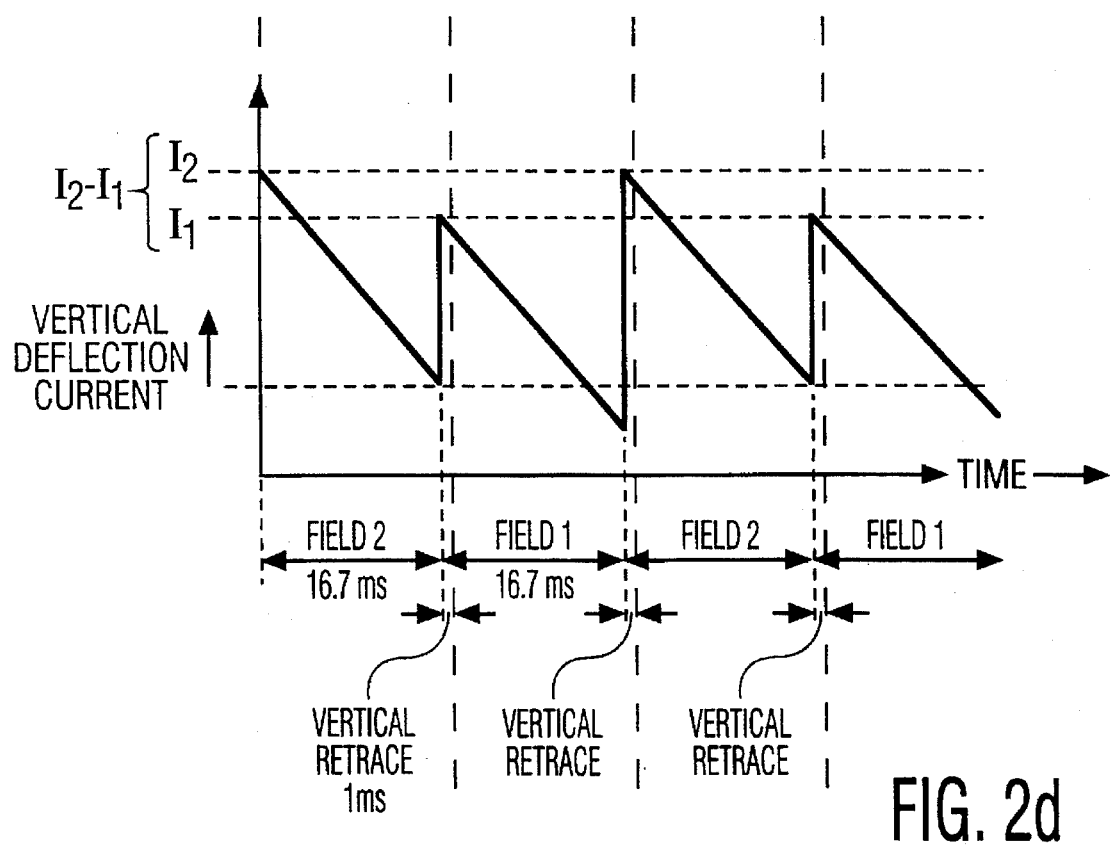
FIG. 2d depicts, in accordance with the invention, current through the vertical deflection yoke during reception of each of the fields of a 1050-line interlaced signal.

The input to the gate of transistor T1 is a field identification signal as shown in FIG. 2c. This field identification signal indicates when a first field of a 1050-line interlaced video signal is being received and when a second field of a 1050-line interlaced video signal is being received. An example of such a field identification signal is shown as a square wave, where reception of the first field of a 1050-line video signal is indicated as a low and reception of the second field of a 1050-line video signal is indicated as a high, and where the pulse widths 15 correspond to the duration of time that each field is being received. This field identification signal is generated from the vertical sync signal which vertical sync signal includes a field pulse identifier as shown in the Society of Motion Picture and Television Engineers proposal.

During reception of a standard NTSC signal the field identification signal will not be present at the input of transistor T1 and transistor T1 will remain OFF or non-conducting. Because the jog circuit 11 is not enabled during reception of an NTSC signal, the vertical deflection circuitry 13 and vertical deflection yoke 14 operate as described in the Background of the Invention, that is, "natural" interlacing will result without having to change the amount of current through the vertical deflection yoke 14 during reception of the second field.

During reception of a 1050-line interlaced signal, or any interlaced signal having an integral number of scan lines in each field, a field identification signal will be generated at the input of transistor T1. This field identification signal turns transistor T1 ON only during reception of the second field of an interlaced signal having an integral number of scan lines in each field. When transistor T1 is ON, R6 is in parallel with the resistance seen from point A to ground. This decreases the total resistance from the output of IC1 to ground which increases the amount of current through the vertical deflection yoke 14 as shown in FIG. 2d. I1 and I2 indicate the current levels in the vertical deflection yoke 14 during reception of a first field and a second field of a 1050-line interlaced video signal, respectively. The slope of the ramp-like current with respect to time will remain the same, but the current levels in the vertical deflection yoke 14 during reception of the second field will be higher than during reception of the first field. This increase in current shifts the initial starting point of a scan of a second field so that the scan lines of the second field interlace the scan lines of a first field, thereby producing a complete picture.

Figure 1A:
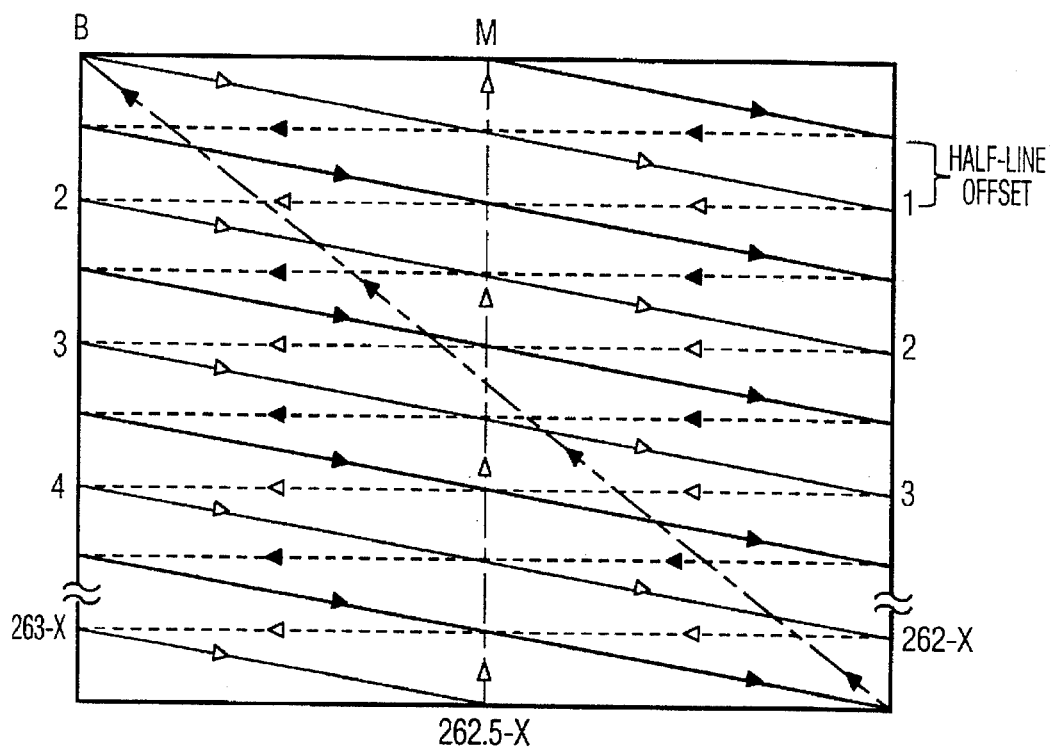
FIG. 1a shows the scanning path for an NTSC 525-line interlaced system.
Figure 1B:
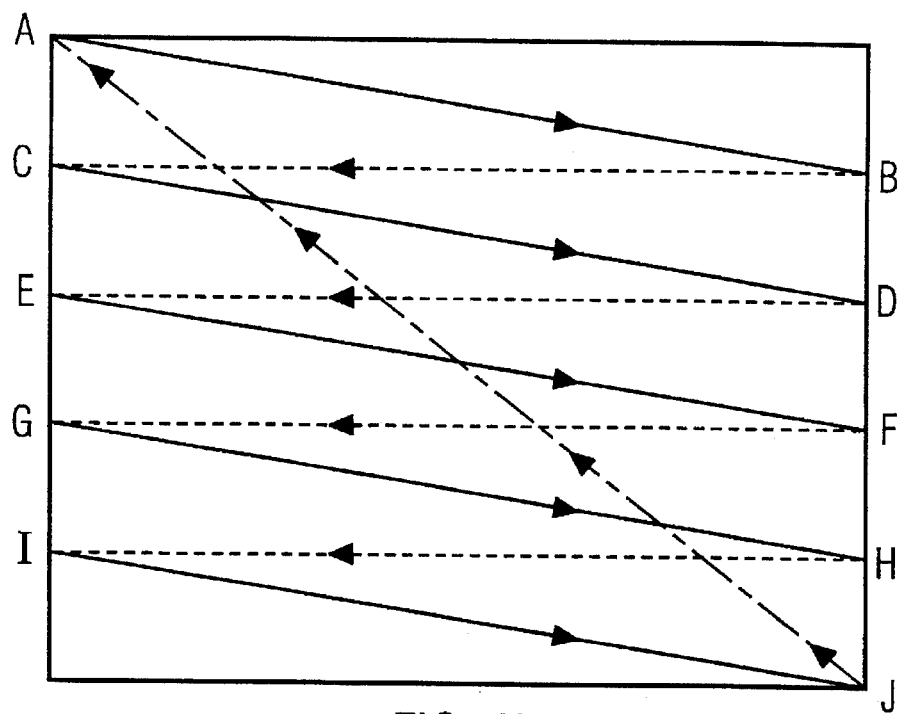
FIG. 1b shows the scanning path for a 525-line progressive system.

FIG. 2b shows the scanning path of a 1050-line interlaced system. The field 1 and field 2 scanning representations are the same as those shown in FIGS. 1a and 1b, that is, a field 1 scan is indicated by solid lines with open arrows and field 2 scans are represented by solid lines with solid arrows etc. As can be seen from FIG. 2b the vertical retrace for both fields occur at the end of the last line of each field. The one half-line offset in the vertical direction is due to the jog circuit 11.

FIG. 2d is a diagram of the vertical deflection currents I1 and I2 through the vertical deflection yoke 14 during reception of the first field and second field of a 1050-line interlaced signal respectively. The difference $I_2-I_1$ between the currents I1 and I2 at each point in time results in the one-half line offset in the vertical direction of the second field from the first field. A slight exponential ramp in the ramp-like current is caused during a vertical retrace as shown. Time values and current levels are indicated for a 1050-line interlaced system having component values described below.

Figure 3:
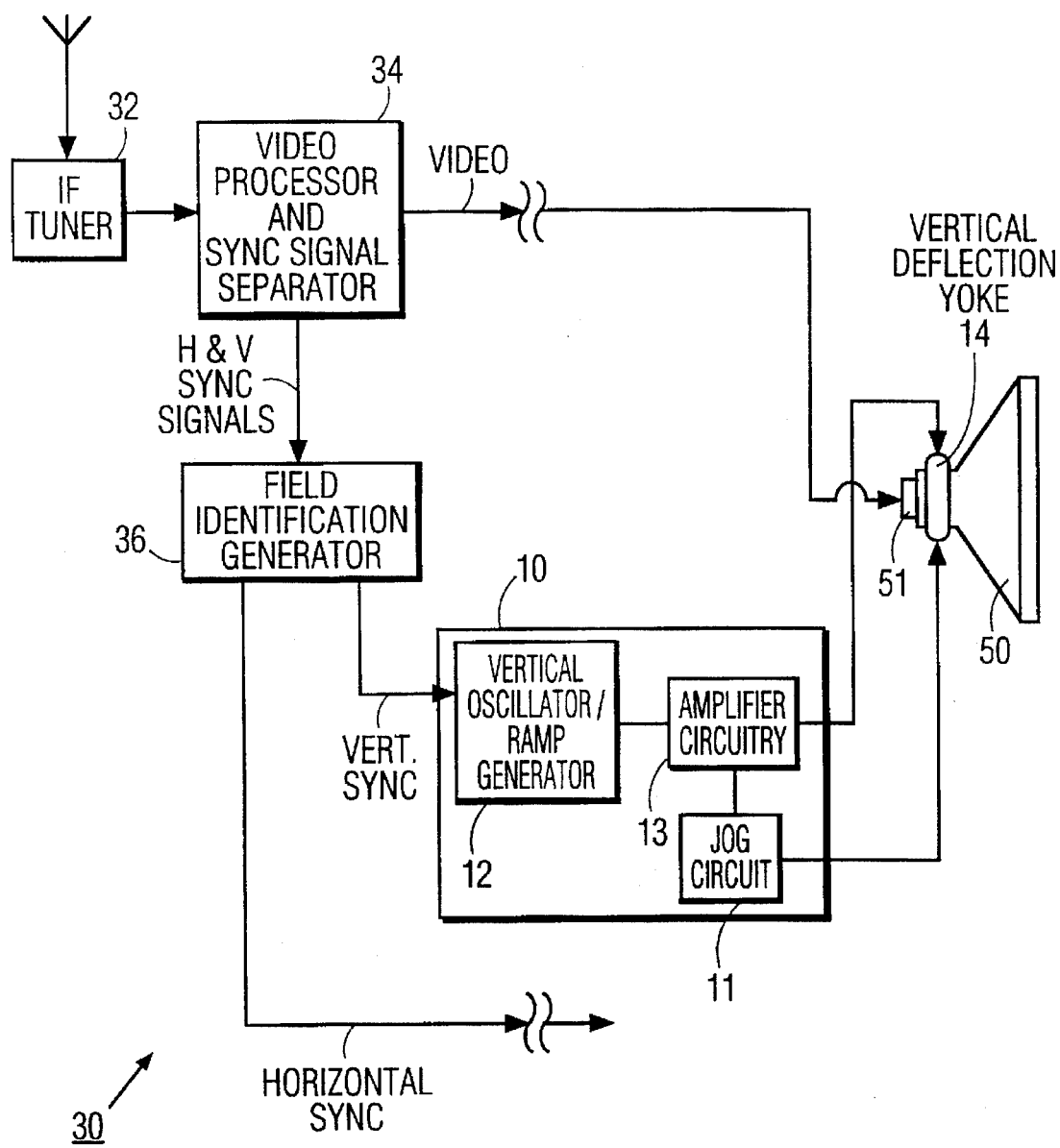
FIG. 3 shows a block diagram of a television receiver in accordance with the invention.

FIG. 3 is a block diagram of a television receiver in accordance with the invention generally indicated at 30. An IF tuner 32 is provided to separate either the NTSC or 1050-line interlaced signals from other non-relevant signals received at the antenna. The NTSC and 1050-line signals each include a video portion, a sound portion and sync signals. The video processor and sync separator 34 separates out the video signals and the sync signals from the sound signals. The video signals are further processed for scanning by the electron beam generator 51 on the picture tube 50 as described in, for example, "Television How It Works". The horizontal and vertical sync signals are separated from the video signal and sent to the field identification generator 36. The vertical sync signal is also sent to the vertical deflection amplifier and jog circuit 10 and processed as described above. The field identification generator 36 uses the vertical sync signal and the field identification pulse to generate a square wave pulse or field identification signal which controls transistor T1 of jog circuit 11. The jog circuit 11 has an output coupled to the vertical deflection yoke 14. The output of amplifier circuitry 13 is also coupled to the vertical deflection yoke 14, both as shown in FIG. 2a.

The horizontal sync signal is sent to additional horizontal circuitry shown and described, for example, in "Television How it Works".

The component values of the circuit shown in FIG. 2a are as follows: The vertical deflection yoke 14 comes assembled with a CRT as part number P/n 330308-1 from Philips Display Components Corp. (PDCC) and can be modelled by a 7 ohm resistor and a 10 mH inductor. The vertical deflection yoke 14 is coupled to the vertical deflection circuitry so that an increase in current through the vertical deflection yoke 14 deflects the electron beam in the upward direction. Amplifier IC1 has a part number of P/n 612444-1, Generic Philips TDA 3640. Resistor R1 is a 10K ohm resistor. Resistor R2 is 510 ohms, resistor R3 is 33K ohms, resistor R4 is 11K ohms, resistor R5 is 1.3 ohms and resistor R6 is 1K ohms. Capacitor C1 is a 2.2 µF capacitor. Capacitor C2 is 3300 µF.

It should be noted that the current through the vertical deflection yoke can be decreased for one of the fields instead of increased if the vertical deflection yoke is coupled so that an increase in current deflects the electron beam in the downward direction. There are also other modifications which could be made to the circuit depending on whether an upward or downward deflection of a field is desired. Similarly, when reference is made to the second field it is not necessarily referring to the field received second in time. Specifically, the jog circuit can be activated to change the amount of current in the vertical deflection yoke during either the field received first or second in time, it just must be activated during one of the two fields.

It will thus be seen that the objects set forth above, among those made apparent from the preceding description, are efficiently attained and since certain changes may be made in the above constructions without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A vertical deflection circuit for use in a picture display device having a vertical deflection yoke and means for scanning an interlaced video signal, the video signal having a first field having an integral n number of scan lines, a second field having an integral n number of scan lines which two fields form a single picture when interlaced, and vertical sync signals for indicating the end of each field, the vertical deflection circuit comprising:

means for receiving the vertical sync signals;

a ramp generator for generating a ramp-like signal for inducing a ramp-like current in the vertical deflection yoke upon receipt of each vertical sync signal, the ramp-like current being generated for each field of the video signal and causing vertical deflection of the video signal such that the means for scanning scans the scan lines of each field spaced from one another on the picture display device; and jog means for changing the amount of ramp-like current in the vertical deflection yoke by a predetermined amount during scanning of the scan lines of the second fields, such that the amount of current in the vertical deflection yoke for each scan line of the second field differs from the amount of current in the vertical deflection yoke for the same numbered scan line of the first field by the predetermined amount which causes the vertical deflection yoke to deflect each of the scan lines of the second fields such that they are scanned in the spaces between the scan lines of the first fields and wherein the spaces are not blanked scan lines but are the spaces normally found between two consecutively numbered scan lines.

2. The vertical deflection circuit as claimed in claim 1, wherein the video signals are 1050-line interlaced video signals.

3. The vertical deflection circuit as claimed in claim 2, wherein the display device also includes means for receiving NTSC signals and wherein the jog circuit changes the amount of ramp-like current in the vertical deflection yoke only during scanning of the second fields of a 1050-line interlaced signal.

4. The vertical deflection circuit as claimed in claim 1, wherein the jog means includes (i) a transistor having a main conducting path and (ii) a resistor having a first end and a second end, the main conducting path of the transistor having one end coupled to the vertical deflection yoke and the other end coupled to the first end of the resistor, the second end of the resistor being coupled to ground.

5. A method of interlacing a video signal in a picture display device, which video signal includes a first field having an integral number n of scan lines and a second field having an integral number n of scan lines, which two fields form a single picture when interlaced, the video signal further including vertical sync signals which indicate the end of each field, the method comprising the steps of:

receiving the video signal;

generating a field identification signal which field identification signal distinguishes between reception of the first fields and reception of the second fields;

generating a ramp signal upon detection of each vertical sync signal;

causing a ramp-like current in a vertical deflection yoke by applying the ramp signal to the vertical deflection yoke, the ramp-like current causing vertical deflection of the video signal;

scanning the first field such that the scan lines of the first field are spaced from one another on the picture display device in accordance with the deflection provided by the ramp-like current generated in the vertical deflection yoke and without blanking alternate scan lines; and changing by a predetermined amount the amount of current through the vertical deflection yoke during reception of the second field such that the amount of current in the vertical deflection yoke for each scan line of the second field differs from the amount of current in the vertical deflection yoke for the same numbered scan line of the first field by the predetermined amount, such that each scan line of the second field is deflected and scanned in the space between the same numbered scan line of the first field and a next consecutively numbered scan line of the first field thereby forming an interlaced picture on the picture display device.

6. The method of claim 5, wherein the step of changing includes the step of increasing the amount of current through the vertical deflection yoke during reception of the second field.

7. A vertical deflection circuit for operation in a picture display device including means for receiving 1050-line interlaced video signals having for each interlaced picture (i) a first field having an integral number, 525, of scan lines, (ii) a second field having the integral number, 525, of scan lines, and (iii) vertical and horizontal sync signals, the vertical sync signals indicating the end of a field and the horizontal sync signals indicating the end of a scan line, the vertical deflection circuit comprising:

means for receiving the video signals;

a ramp generator for generating a ramp-like signal in response to each of the vertical sync signals;

a vertical deflection yoke for receiving the ramp-like signals and for generating ramp-like current which causes vertical deflection of the scan lines of the video signals;

means for scanning the scan lines of the video signals on the picture display device synchronized by the vertical and horizontal sync signals and in accordance with the vertical deflection provided by the vertical deflection yoke;

field identification generating means for generating a field identification signal dependent upon the vertical sync signals, which field identification signal indicates reception of the scan lines of the first field and reception of the scan lines of the second field; and jog means coupled to the vertical deflection yoke and controlled by the field identification signal, for changing the amount of ramp-like current through the vertical deflection yoke during reception of the second fields such that the amount of current in the vertical deflection yoke for each scan line of the second field differs from the amount of current in the vertical deflection yoke for the same numbered scan line of the first field by the predetermined amount such that the respective scan lines of the second fields are deflected and scanned in the spaces between the scan lines of the first fields thereby forming an interlaced picture, and wherein the spaces do not correspond to blanked scan lines but are the spaces between two consecutively numbered scan lines.

8. The vertical deflection circuit according to claim 7, further including an amplifier having inverting and non-inverting inputs and an output, coupled between the ramp generator and the vertical deflection yoke, and feedback circuitry coupled from the vertical deflection yoke to the inverting input of the amplifier, which feedback circuitry provides the ramp-like current from the vertical deflection yoke to the inverting input of the amplifier for ensuring that the ramp-like current follows the ramp-like signal generated by the ramp generator and provided to the amplifier at its non-inverting input.

9. The vertical deflection circuit according to claim 7, wherein the jog means includes a resistor and a transistor having a main conducting path, the resistor having a first end coupled to ground and a second end coupled to a first end of the main conducting path of the transistor, a second end of the main conducting path being coupled to the vertical deflection yoke.

10. The vertical deflection circuit according to claim 9, wherein the field identification signal includes a first value for making the main conducting path conducting during reception of the second field, and a second value for making the main conducting path non-conducting during reception of the first field.

11. A television for operation with 1050-line interlaced video signals having for each interlaced picture a first field having an integral number, 525, of scan lines, a second field having the integral number, 525, of scan lines and vertical sync signals for indicating the end of each field, the television comprising:

means for receiving the 1050-line video signals;

a picture tube for displaying the 1050-line video signals;

means for scanning the scan lines of the 1050-line video signals on the picture tube;

a ramp generator for generating a vertical deflection ramp voltage in response to the vertical sync signal;

a vertical deflection yoke for receiving the vertical deflection ramp voltage and for generating a ramp-like current for causing deflection of the scan lines of the video signals in dependence on the ramp-like current such that the scan lines of each field are spaced from one another on the picture tube;

field identification generating means for generating a field identification signal dependent upon the vertical sync signal and for indicating reception of the scan lines of the first fields and reception of the scan lines of the second fields; and jog means coupled to the vertical deflection yoke and controlled by the field identification signal, for changing the amount of current through the vertical deflection yoke during reception of the second fields, such that the amount of current in the vertical deflection yoke for each scan line of the second fields differs from the amount of current in the vertical deflection yoke for the same numbered scan line of the first fields by the predetermined amount such that each of the scan lines of the second fields are deflected and scanned in the spaces between the scan lines of the first fields thereby forming an interlaced picture, and wherein the spaces do not correspond to blanked scan lines but are the spaces between two, consecutively numbered scan lines.

12. The television according to claim 11, further including means for receiving conventional display signals, and wherein the jog means does not vary current through the vertical deflection yoke during reception of the conventional display signals.

13. A vertical deflection circuit for operation with both (i) 1050-line interlaced signals having for each interlaced picture a first field of 525 scan lines, a second field of 525 scan lines and vertical sync signals, and (ii) NTSC signals having for each interlaced picture a first field of 262.5 scan lines, a second field of 262.5 scan lines and NTSC vertical sync signals, the vertical deflection circuit comprising:

receiving means for receiving the sync signals;

a ramp generator coupled to the receiving means for generating a ramp voltage which varies in a ramp-like fashion;

an amplifier having a (i) non-inverting input, coupled to the ramp generator, (ii) an inverting input and (iii) an output;

a vertical deflection yoke for generating a ramp-like current and having an input coupled to the output of the amplifier;

feedback means having a first end coupled to an output of the vertical deflection yoke and a second end coupled to the inverting input of the amplifier;

field identification generating means for generating a field identification signal dependent upon the vertical sync signal and having a first value for indicating reception of the scan lines of the first fields of the 1050-line interlaced signals and a second value for indicating reception of the scan lines of the second fields of the 1050-line interlaced signals; and a jog circuit having a first end coupled to the output of the vertical deflection yoke for causing a change by a predetermined amount in the ramp-like current in the vertical deflection yoke only during reception of the second fields of the 1050-line interlaced signals, which change is with respect to the ramp-like current in the vertical deflection yoke during reception of the first fields of the 1050-line interlaced signals, such that the amount of current in the vertical deflection yoke for each scan line of the second fields differs from the amount of current in the vertical deflection yoke for the same numbered scan line of the first fields by the predetermined amount, the jog circuit further including (a) a transistor having a main conducting path and a control electrode and (b) a resistor, the main conducting path and the resistor being coupled between the vertical deflection yoke and ground, the control electrode being coupled to receive the field identification signal and to cause the main conducting path to become conducting during reception of the second fields.

14. A receiver compatible with both (i) conventional interlaced video signals and (ii) non-conventional interlaced video signals having a first field and a second field each field having an integral number n of scan lines and which two fields together form an interlaced picture, the receiver comprising:

means for receiving both the conventional video signals and the second interlaced video signals;

vertical deflection means for providing a vertical deflection signal for vertically deflecting the scan lines of both video signals; and a jog circuit responsive to reception of the second fields of the non-conventional interlaced video signals, and coupled to the vertical deflection means for causing a predetermined change in the vertical deflection signal during reception of the second fields of the non-conventional interlaced video signals such that the amount of current in the vertical deflection yoke for each scan line of the second fields differs from the amount of current in the vertical deflection yoke for the same numbered scan line of the first fields by the predetermined amount such that the scan lines of the second fields are deflected to interlace with the scan lines of the first fields thereby forming an interlaced picture, and wherein the interlacing is not provided by blanking every other scan line of each field but by scanning the field lines of the second fields of the non-conventional interlaced video signals in the spaces between consecutively numbered scan lines of the first fields of the non-conventional interlaced video signals.

15. A vertical deflection circuit for use in a picture display device having a vertical deflection yoke and means for scanning an interlaced video signal, the video signal having a first field having an integral number n of scan lines, a second field having an integral number n of scan lines, and vertical sync signals for indicating the end of each field, the vertical deflection circuit comprising:

means for receiving the vertical sync signals;

a ramp generator for generating a ramp-like signal for inducing a ramp-like current in the vertical deflection yoke upon receipt of each vertical sync signal, the ramp-like current being generated for each field of the video signal and causing vertical deflection of the video signal such that the means for scanning scans the scan lines of each field spaced from one another on the picture display device; and jog means for changing the amount of ramp-like current in the vertical deflection yoke by a predetermined amount during scanning of the scan lines of the second fields, such that the amount of current in the vertical deflection yoke for each scan line of the second field differs from the amount of current in the vertical deflection yoke for the same numbered scan line of the first field by the predetermined amount which causes the vertical deflection yoke to deflect each of the scan lines of the second fields such that they are scanned in the spaces between the scan lines of the first fields thereby forming an interlaced picture on the display screen, and wherein the spaces are not formed by blanking alternate lines of each field, and wherein the jog means includes a switch coupled to the vertical deflection yoke and a current changing device coupled to the switch, the switch for coupling the current changing device to the vertical deflection yoke during scanning of one of the first and second fields.

* * * * *